United States Patent

Greenhug

[11] 3,909,568
[45] Sept. 30, 1975

[54] IMPACT MONITOR OR SHOCK INDICATOR

[75] Inventor: Bart E. Greenhut, Pepper Pike, Ohio

[73] Assignee: Impact-O-Graph Corporation, Bedford, Ohio

[22] Filed: Mar. 28, 1974

[21] Appl. No.: 455,549

[52] U.S. Cl. .................. 200/61.45; 116/114 AH
[51] Int. Cl.² ........................................ H01H 9/00
[58] Field of Search......... 116/114 AH; 73/492, 514, 73/71, 71.2; 200/61.45 R, 61.51; 340/262

[56] References Cited
UNITED STATES PATENTS
3,149,606  9/1964  Falkner.................. 116/114 AH FOREIGN PATENTS OR APPLICATIONS
652,077  4/1951  United Kingdom.......... 116/114 AH

*Primary Examiner*—James J. Gill
*Attorney, Agent, or Firm*—Isler & Ornstein

[57] ABSTRACT

An impact monitor or shock indicator for sensing and indicating the occurence of excessive damaging impacts or shock loads, such as might occur to goods in transit or handling or which may even occur in the utilization of certain types of instruments, devices or machinery through accident or inadvertence and which could cause physical damage or injury or malfunction of the goods involved. A calibrated device is provided having a pair of opposed spring-loaded balls which serve as inertial masses retained in opposed ball seats which are slidably mounted in upstanding resilient or yieldable support arms which are secured to a common base. The maximum spacing between the opposed ball seats is limited by opposed abutments extending exteriorly of the ball seats in the form of a sleeve or cap which is slidably movable downwardly over the support arms and the ball seats into engagement with the base. Anyone of various forms of camming means can be utilized to yieldably displace the support arms inwardly relatively to each other in opposition to their normal stance so as to further energize or compress the spring and enhance or increase the stability of the shock indicator beyond its calibrated limits for the purpose of delivery of shipment of the shock indicator to the user. The support arms may be provided with supplementary ball seating surfaces to engage the balls when the support arms are displaced to this described transport position. Withdrawal or disengagement of the support arm displacing means serves to restore the impact monitor to its calibrated stability value for its intended operative use.

19 Claims, 8 Drawing Figures

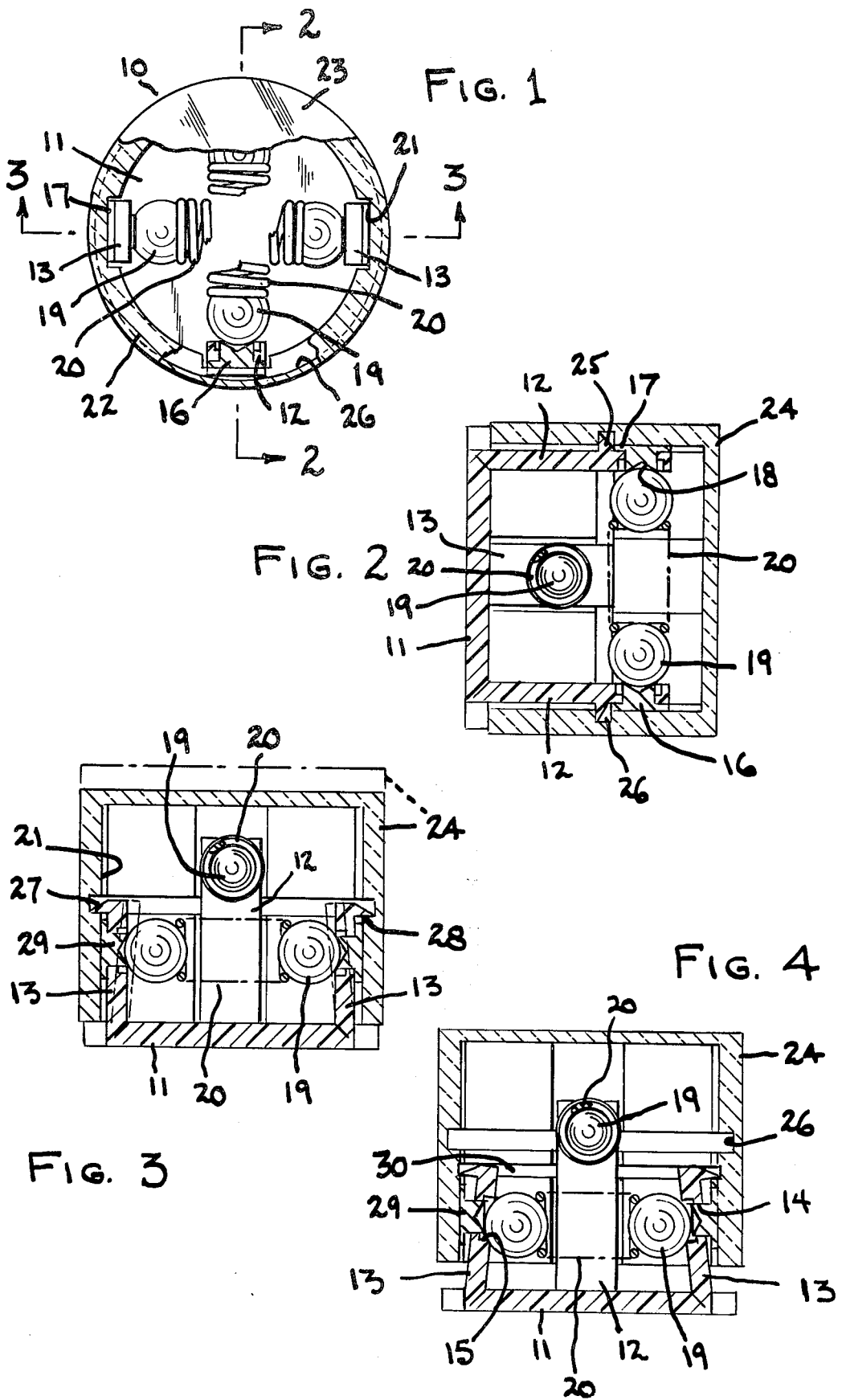

IMPACT MONITOR OR SHOCK INDICATOR

BACKGROUND OF THE INVENTION

When goods of any kind are handled and moved in shipment, the possibility exists that damage or breakage may occur as a consequence of mishandling, abuse, accident, excessive impact, shifting of cargo or the like. The sensitivity or fragility of the particular goods involved determines the extent to which they can withstand or remain unaffected by various magnitudes of impact or shock forces, which are customarily expressed in units of gravitational force or G-units. For each particular type of goods, there is a ascertainable or safe G-level of impact which the goods should be able to withstand without injury. Beyond this empirically determined G-level, there is a probability or a likelihood that the magnitude of impact may have resulted in damage to the goods. The resultant damage is frequently not visible or immediately ascertainable, particularly in those instances where the goods are delivered packaged and neither the shipper nor the freight forwarder is aware of the occurence of any excessive impact. When the injury or damage to the goods is finally discovered by the purchaser, controversy may arise as to whether the shipper, the freight forwarder or the customer is responsible for the damage.

In order to remove or minimize the uncertainty as to who shall be the responsible or liable party in the above-described circumstances, shippers have increasingly adopted the utilization of some form of indicating, monitoring or recording device which will provide evidence of the occurence of a possibly damaging shock force or impact from the time that it leaves the shipper until it is received by the purchaser. Representative forms of such devices are disclosed in U.S. Pat. Nos. 2,475,728; 2,578,803 and 3,149,606. Some of the prior art devices are intended to be mounted in a freight car or a cargo van and are power driven to maintain a continuous visible record, in the nature of an accelerometer graph of the G-forces acting on the shipped goods from point of departure to point of destination. In other prior art forms, the monitor device is calibrated to be stable below a given G-level and to be unstable above the calibrated level of the device will cause some visible disarrangement of the parts indicating excessive impact. It is this latter type of monitoring device to which the present invention is directed.

A problem arises from the fact that the monitor devices themselves are goods which must be shipped from seller to purchaser; the purchaser being the shipper who will ultimately put the monitoring devices to use in connection with the shipment of goods which are sold and to be delivered by the shipper. Since devices of the type shown in U.S. Pat. No. 3,149,606 can be preassembled for shipment, but unless they are of a relatively high G level of calibration, it may well be that they will not reach their destination in the desired assembled arrangement. Shock forces and impacts during shipment of the devices themselves will exceed the calibrated limits of the devices and cause the inertial masses or balls to escape from their seats so that the device will be inoperative when it reaches the purchaser, who must then go to the trouble of reassembling the monitoring device before it can be put to use. Alternatively, the seller may simply avoid this possible delivery problem by not attempting to ship an assembled device, but simply shipping the device in disassembled condition with the burden being on the purchaser to assemble the device properly before it can be utilized. Under either circumstance, it will be apparent that the device must be designed for ease of assembly and disassembly so that the customer can conveniently reassemble the device into operative condition when necessary. However, a device so designed could also be easily disassembled and reassembled in an unauthorized circumstance to erase any evidence of excessive impact which may have occurred through carelessness on the part of a freight forwarder's employees during delivery of goods to which the accelerometer is attached. Thus, the ease of assembly and disassembly of the device tends to defeat the purpose of its use, but is necessary to accomodate to the realities of disarrangement of the device itself which may occur in its shipment from the seller to the purchaser of the device.

SUMMARY OF THE INVENTION

It is a primary object of the invention to provide a compact shock indicating device of the accelerometer type which is substantially tamper-proof.

It is another object of the invention to provide a shock indicating device which can be manufactured at extremely low cost so that it is economically feasible that it be expendable or have a single-use life.

Still another object of the invention is to provide an impact monitor of the character described which is calibrated for two G-levels, one of which is the monitoring level and the other of which is a transport level for the device itself which is considerably higher than the monitoring level.

Other objects and advantages of the invention will appear during the course of the following description and with reference to the annexed drawings in which like parts are designated by like numerals throughout the same.

BRIEF DESCRIPTION OF THE DRAWINGS

FIG. 1 is a plan view of a shock indicator unit embodying features of the invention, portions thereof being broken away to show interior detail.

FIG. 2 is a cross-sectional view, taken as indicated on line 2—2 of FIG. 1.

FIG. 3 is a cross-sectional view, taken as indicated on line 3—3 of FIG. 1.

FIG. 4 is a cross-sectional view, similar to FIG. 3 and showing a modified form of the invention.

DESCRIPTION OF THE PREFERRED EMBODIMENTS

Figure 5:
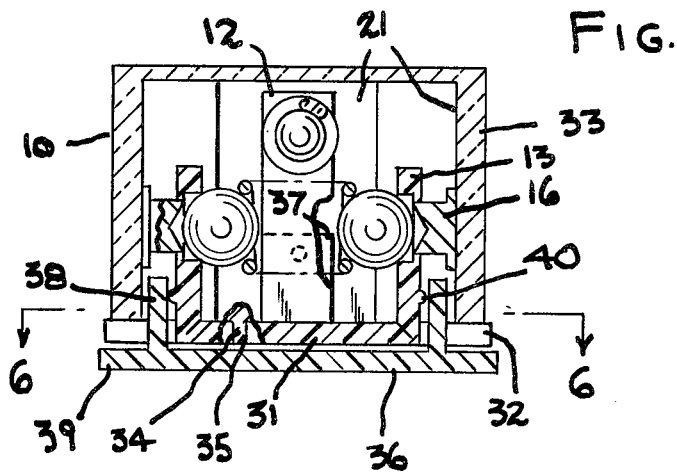
FIG. 5 is a cross-sectional view, similar to FIG. 3 and showing still another modification of the invention.

Referring more particularly to FIGS. 1–3 of the drawings, there is shown an accelerometer designed to be utilized as a preset impact monitor or shock indicator 10. The device 10 includes a base 11, here shown as being somewhat in the shape of a disk, and provided with a plurality of support elements here shown as two diametrically opposed upstanding long arms 12 and a pair of diametrically opposed short arms 13 angularly spaced at 90° from the long arms 12. Both pairs of arms 12 and 13 are provided with apertures 14 extending therethrough and counterbored or recessed as at 15 on the inboard side of each of the arms for a purpose to be described. The apertures 14 in the long arms 12 are at a uniform height above the base 11 so as to be substantially coaxial with each other and the same is also true of the apertures 14 in the short arms 13 except that these apertures are disposed at a level below the level of the other pair of apertures.

Although the base and its associated arms may be formed in any suitable manner, it is preferable that the base and arms be molded as a flat piece from a resilient or elastomeric synthetic resin such as polypropelene, and that the molded radially extending arms be bent upwardly toward the upstanding position which they will maintain in the assembled device. This displacement or deformation of the arms to their operative position is yieldably opposed by the resilient characteristic of the material used so that the arms are normally urged outwardly away from each other.

Slidably mounted in each of the apertures 14 is a ball seat element 16 having an enlarged head portion 17 which is disposed on the exterior or outboard side of the respective arms 12 and 13 and having a conically recessed end portion 18 which extends through and is presented on the opposite or inboard side of each of the arms.

Suitably sized inertial masses, here shown as metal balls 19, are adapted to seat and be retained in the conical recesses 18 of the four seat elements 16 and are yieldably held in place by a helical compression coil spring 20 which extends between each opposed pair of balls and biases the balls into their respective seats.

Inasmuch as the accuracy of response and the precision calibration of the shock indicator device 10 depends upon several interrelated factors such as the unstressed heighth of the spring 20, the weight of the balls 19, the size of the balls in relation to the size of the recess 18 and the extent to which the spring is energized when it is in its operative position, it is of importance that the spacing between the opposed pair of ball elements 16 be established with precision and uniformity, as such spacing is critical to establishing and maintaining the desired extent of compression of the coil spring 20 for accurate calibration of the device. In order to establish this critical spacing between opposed ball elements 16, abutment surfaces 21 are provided adjacent the heads 17 of the ball elements so as to limit the maximum outward displacement of the elements 16 when the unit is assembled. The abutment surfaces 21 can be provided in various ways but are here shown as planar interior surfaces on a cylindrical sleeve 22 which can be lowered over the arms 12 and 13 and brought into engagement or securement with the base 11. The sleeve 22 is preferably molded from a high impact synthetic resin so as to be extremely rigid and thereby maintain extremely precise and uniform dimension between the opposed abutment surfaces 21. In order to protect the inertial mass assembly, consisting of the spring 20 and the balls 19, from direct physical contact with any foreign object, as well as to prevent the components of this assembly from being scattered when the balls dislodge or deseat in response to an excessive impact force, it is desirable that the end of the sleeve opposite the base be closed or capped, as at 23. More importantly, the closing of this end of the sleeve prevents unauthorized access to the parts contained therein and thus prevents resetting of the device 10 after the inertial mass has once been dislodged. It is desirable and expedient that the sleeve 22 and its cap 23 be molded as a single unitary piece and it is also necessary that the material from which the cap 23 is made have a sufficient degree of transparency to permit an observer or inspector to easily ascertain the position of the parts by viewing them through the cap 23 or preferably through the sleeve 22, as well. Thus, desirably, the sleeve 22 and cap 23 are molded as a single unitary cup 24 of transparent material.

Projections or ribs 25 are provided in a common plane on the outboard side of each of the arms 12 and 13 and are adapted to snap into or be received in an annular groove 26 interiorly of the sleeve portion 22 of the cup 24. The depth of the groove or its diameter is sufficiently great to permit the resilient outboard movement of the arms to a position where they will cause the head portion 17 of the ball seat element to engage the abutment surface 21 provided by the sleeve. Preferably, the projection 25 is provided with an angled or inclined upper surface 27 which is readily and conveniently cammed by the downward motion of the sleeve around the arms to displace the arms relatively inwardly toward each other. The under surface 28 of the projection may be inclined slightly in the same direction as the surface 27 or may extend diametrically as indicated so that the underside of the projection 25 will lock in the groove 26 and prevent disassembly of the cup from the base after the cup has been lowered over the arms into engagement with the base. The spaced abutment surfaces 21, which in this instance are provided by longitudinally extending recesses in the sleeve 22, serve to prevent any angular displacement of the cup 24 relative to the base after the two parts have been locked into position. It will be understood that other types of registration means such as small dowels or the like could be utilized, if desired, to properly position the cup relatively to the base and secure it against relative angular rotation.

FIGS. 1–3 of the drawings illustrate the parts in assembled, locked relationship. It will be noted that the stem or barrel 29 of the ball seat element 16 traverses the arm on which it is slidable carried and projects inwardly thereof so that the ball 19 seats on the conical or spherical recess 18 of element 16 and the spring 20 urges the head portion 17 of the element 16 into abutment with the surfaces 21 independently of any slight variation that may exist in the normal stance of the arms 12 and 13 relatively to each other and regardless of whether this deviation be uniform with respect to each arm or erratic. Inasmuch as the balls do not seat directly on the arms, uniformity and reproducability of calibration of the device is obtained despite the lack of rigidity of the arms and the possible slight variations that may exist in the posture or stance of the arms. The rigid and uniformly positioned abutment surfaces 21 maintain the uniformity of the critical factors of the assembly.

One inertial mass assembly consisting of the spring 20 and a pair of seated balls 19 is disposed between the long arms 12 and another such inertial mass assembly is disposed between the short arms 13 at right angles to the axis defined by the long arms 12 and below the plane of the inertial mass assembly disposed between the long arms. This arrangement provides an omni-directional device which will sense impact or shock forces from all directions and which will cause one or the other or possibly both of the inertial mass assemblies to be dislodged or unseated from the elements 16 in response to an impact force exceeding the monitoring level to which the device is calibrated. Such an excessive level of impact force causes one or the other of a pair of balls 19 to drop out of its seat and the inertial mass assembly components become disassociated from each other. Upon visual inspection of the shock indicator device 10 at its destination, this disassociation of the parts can be readily observed through the transparent cup 24, giving positive indication that the body to which the device was attached has been subjected to an impact or shock force exceeding the calibrated level of sensitivity of the indicator device to which it was preset. This indication alerts the purchaser to carefully inspect and test the goods involved for damage or malfunction prior to complete acceptance of the goods from the freight forwarder.

The preset response characteristics of the impact monitor can be varied to suit different monitoring levels by selecting a spring 20 having the desired ounces or grams of retaining force or pressure on the balls 19. A stronger spring 20 will establish a higher calibrated monitoring level of impact response than a weaker spring will. So without changing any of the other dimensional or physical characteristics of the device 10, a broad range of differing monitoring levels can be established by proper selection of differing spring strengths. This permits all of the components of the device 10, with the exception of the spring 20, to be utilized uniformly over a very broad range of requirements for monitoring levels.

Conveniently, the under surface of the base 11 is provided with a self-sticking, tape-covered adhesive film for securing the impact monitor to a cargo van, a carton or directly to a piece of apparatus or equipment, as the case may be. Obviously, where required or desired, other means may be provided for securing the indicator device to a body.

Although an omni-directional device 10 has been described utilizing two inertial mass assemblies, it will be apparent that a device embodying the principles of the invention need utilize only one inertial mass assembly if the omni-directional response characteristic for the device is not required under particular applications or circumstances. For example, the use of the indicator device is not restricted to impact forces occurring during transit, as the device may be applied to fixed installations or operative equipment or apparatus which is known to be subject to impact forces during its normal operation but an indicataion is desired if such impact forces exceed a prescribed level or magnitude. Such might be the case for example in the use of an impact monitor on landing gear for aircraft where the existence and direction of acceptable levels of impact force is known and no omni-directional indication is required.

It should also be noted that the term "balls" as used herein is intended to be descriptive of any suitable configuration of inertial mass having conical or spherical surfaces which will serve the intended purpose of yieldably seating on the elements 16. It is not intended that the term ball be restricted narrowly to a wholly spherical object. Thus, the invention contemplates the use of inertial masses suitably formed for the purpose which are not wholly spherical in shape and also contemplates the use of only a uni-directional inertial mass assembly if an omni-directional characteristic of the indicator device is not desired or required.

The device illustrated and described with reference to FIGS. 1–3 of the drawings is a low-cost, expendable device which cannot be disassembled without destruction or mutilation of the parts and therefore cannot be reset in an unauthorized manner to remove indicated evidence of an excessive impact. The described device lends itself to precise, ready calibration of a desired monitoring level within a broad range of impact forces by selection of a proper strength of spring 20, without any change in the form, dimension or characteristics of the other components of the device. Its production cost can therefore by kept low enough so that it can be discarded once it has served its purpose. Obviously, if the inertial mass assembly has not been subjected to an excessive impact force during transit of the goods, then it can be reused as no resetting would be required for such reuse for the same monitoring level of impact.

Still referring to FIGS. 1–3 of the drawings and more particularly to FIG. 3, there is shown a characteristic of the shock indicator device 10 which serves to completely avoid or at least minimize the previously described problem which is encountered in the shipment of the indicator devices themselves in assembled condition from the manufacturer or seller to the purchaser who will apply them to the goods for which impact indication or monitoring is desired. This problem results from the fact that the impact to which the shipment of indicator devices 10 may be subjected during transport may serve to unseat the inertial mass assembly so that some or all of the devices in the shipment may be useless to the purchaser when they arrive at their destination and might require return and reassembly by the manufacturer. As previously indicated and as shown in phantom outline in FIG. 3, when the sleeve 22 is slidably lowered over the resilient arms 12 and 13, the projections 25 are cammed by the inner surface of the sleeve to displace the arms inwardly toward each other sufficiently to cause unseating of the balls 19 from the ball seat element 16 and, instead, cause the balls to seat in the counterbore 15 which provides a supplementary seat for the balls. This inward movement of the arms 12 and 13 causes a further compression of the spring 20 to significantly increase the force exerted by the spring on the balls 19 to retain them in the supplementary seat 15. Thus, when the arms are cammed inwardly toward each other, the calibration of the device is changed from that of the monitoring level of magnitude to that of a considerably higher transport level of magnitude which would require at least twice as great an impact force for dislodgement of the balls 19 than would be required at the monitoring level. Inasmuch as the device 10 is designed by reason of ball size and weight, depth of the ball seat recess 18, and free heighth and strength of the spring 20 to have a very light spring pressure and very little compression of the spring when the device is calibrated to its monitoring level, it will be apparent that even a small inward extent of movement of the arms 12 and 13 to compress the spring 20 will have a significant effect on the calibration of the device 10. Thus, regardless of the monitoring or operative calibration of the assembled device, the support arms can be displaced inwardly sufficiently to establish a transport level of calibration which is of far greater magnitude than the monitoring level. This transport level of calibration will be sufficiently great to prevent unseating or dislodgement of the inertial mass assembly under extreme conditions of impact which would cause unseating of the balls 19 at the monitoring level.

The transport level of calibration is established by sliding the sleeve over the arms and moving the sleeve downwardly to a point short of locking engagement of the projections 25 with the groove 26. The resilient character of the arms causes the sleeve or cup to be frictionally retained on the arms and the devices can be shipped in this condition to the ultimate user. At the point of use, the sleeve is further lowered to cause the locking engagement of the projections in the groove,, the arms are relieved of the camming action of the sleeve and resiliently restore themselves to abutment with the heads 17 of the elements 16, and the balls are thereby transposed from seating engagement with the counterbore 15 into seating engagement with the recess 18 of the ball seat element 16, thereby restoring the inertial mass assembly to its calibrated monitoring level.

In the event that a more secure arrangement is required or desired for the shipment of the devices in the transport position of the cup and base, a second annular groove 30 can be provided in the wall of the sleeve 22 below the plane of the deeper annular groove 26. The groove 30 can be quite shallow and merely serve as a detent to define the transport position of the sleeve relatively to the base and to lock it against withdrawal from this position as shown in FIG. 4. When the shipment of indicator devices reaches the ultimate user destination, the sleeve is moved further downwardly to release the projections from the transport groove 30 and bring the projections into locking engagement with the groove 26 to reestablish the calibrated monitoring level of the indicator device for its intended use.

FIG. 5 of the drawings shows another modified form of the shock indicator or impact monitor in which the internal locking function of the projections 25 is eliminated in favor of permanently securing the cup 24 directly to the base prior to shipment of the indicator devices to the user and utilizing another means for camming the arms 12 and 13 to transport position during shipment. To accomplish this, the modified base 31 is provided with a peripheral notch 32 outwardly of and adjacent to each of the arms 12 and 13. The modified cup 33 is provided with the planar abutment surfaces 21 which need not be recessed in the wall of the sleeve as previously described with reference to the embodiment shown in FIGS. 1-3. The open end surface of the cup 33 is provided with downwardly extending spaced locating dowels 34 which are adapted to register with and be received in corresponding openings 35 provided in the base 31. This arrangement assures that the cup will be secured to the base in the proper angular relationship. When the cup 33 is properly engaged with the base 31, these two components may be heat sealed or adhesively secured to each other in permanent locked relationship with the inertial mass assembly in the calibrated monitoring position. The impact monitor is now in operative assembled relationship.

For purposes of shipping the devices to the user, a detachable transport plug 36 is provided. The plug 36 has diametrically opposed upstanding rigid camming prongs 37 and another pair of like shorter camming prongs 28 angularly displaced 90° therefrom, both sets of prongs being preferably unitary with a support plate 39.

When, as shown in solid lines in FIG. 15, the prongs 37 and 38 are inserted through the notches 32 into engagement with the exterior of the pairs of arms 12 and 13 respectively, the support arms are cammed or displaced inwardly toward each other and the seating of the balls 19 is transposed from the recess 18 of the element 16 to the supplementary seat provided by the counterbore 15, in the manner previously described. If necessary or desirable, projections 40 may be provided on the outboard surfaces of the arms 12 and 13 to assure sufficient camming of the arms by the prongs to establish an adequately high transport level of calibration for shipment of the indicator device. The resilient character of the support arms results in frictional retention of the plug 36 in the transport position.

When the shipment of the impact monitors reaches its destination, the transport plug 36 is withdrawn permitting the support arms to move outwardly into reengagement with the heads 17 of the elements 16 and the inertial mass assembly is restored to its calibrated monitoring level.

Figure 6:
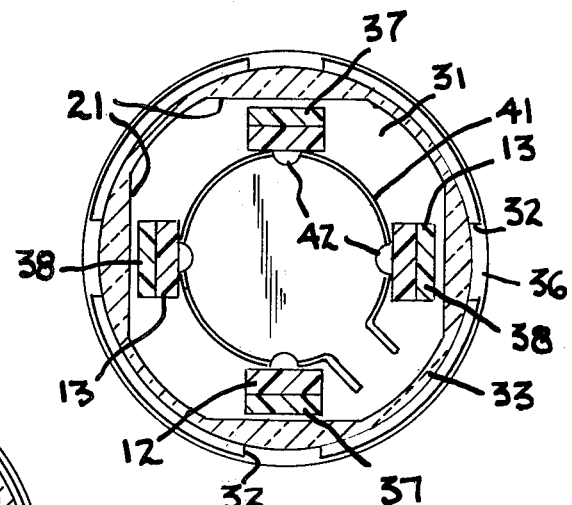
FIG. 6 is a cross-sectional view, taken as indicated on line 6—6 of FIG. 5.

It is a characteristic of the molded synthetic resin material used for the resilient support arms, that its characteristics of resiliency can be adversely affected by extremes in temperature. For example, under extremely cold conditions, the resiliency of the support arms is adversely affected and it may be inadvisable to rely wholly upon the inherent resiliency of the support arms to restore these arms to operative position after they have been retained in the cammed transport position for a long period of time. As illustrated in FIG. 6 of the drawings, this possible problem can be overcome by providing a supplementary separate tension spring, here shown as a metal wire horseshoe spring 41 which is retained adjacent to the inner surface of the base 11 or 31 by suitable projections 42 provided on the inboard surfaces of the support arms 12 and 13. The circular tension spring 41 engages the lower portions of all of the support arms to urge them in an outboard direction and thus complement the inherent resiliency of the support arms in the event that low temperature conditions may impair that inherent resiliency. Inasmuch as the calibrated monitoring level of the shock indicator device is independent of the resiliency or rigidity of the support arms, any variations in the resiliency of the support arms, whether it be inherent resiliency or the combined resiliency as supplemented by the spring 41, will not affect the calibrated monitor level of the indicator device.

Figure 7:
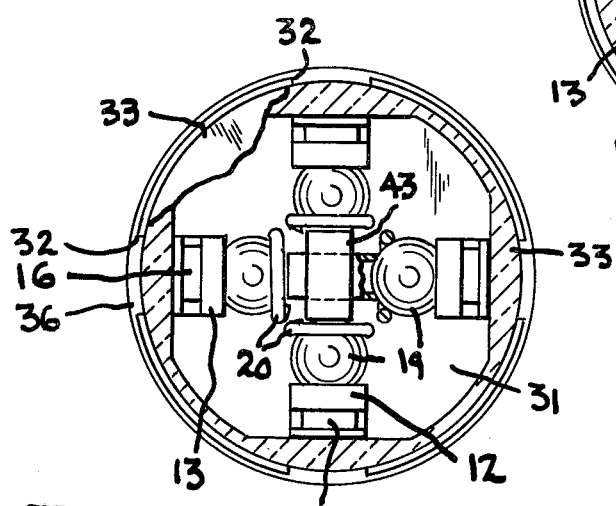
FIG. 7 is a plan view, similar to FIG. 1 showing still another modified form of the invention.

Although the calibrated monitoring level of the indicator device is independent of the resiliency of the support arms, this resiliency of the support arms can be utilized to greatly enhance the stability of the inertial mass assembly during transport, beyond the limits which might be obtainable in reliance solely upon the increased compression of the spring 20 resulting from the inward displacement of the support arms to transport position. As shown in FIG. 7 of the drawings, this is accomplished by utilizing an extremely lightweight, preferably tubular plastic, stabilizer rod 43 which is carried internally of the coil spring 20 and coaxial therewith so as to have its opposite ends in aubtment with the opposing balls 19 when the support arms are cammed to transport position. The stabilizer rod is of a predetermined length and is essentially non-compressible in character. It establishes an inward limit for the movement of the pair of balls 19 toward each other in response to the inward displacement of the support arms. When this limit of inward movement of the balls is attained, there is no further compression possible of the coil spring 20 and any further camming of the support arms cannot cause further displacement of the upper end of the support arms in which the balls are seated. The effect is to cause a greater application of resilient force by the upper ends of the support arms on the balls 19 than could be achieved solely by compression of the spring 20 and thus serves to enhance the stability and resistance of the balls 19 to unseating or dislodging from the supplementary ball seats 15 of the support arms. Thereby, a much higher transport level of calibration for the indicator device is achieved for purposes of shipment of the devices. When the indicator devices are ready to be used and the camming displacement of the arms 12 and 13 is relieved, the support arms are restored to their monitoring level position and the balls 19 are urged by the spring 20 out of their engagement with the ends of the stabilizer rod 43, permitting the rod to simply drop away from its coaxial alignment with the spring 20 and be loosely retained within the confines of the coils of the spring 20 where it will cause no interference with the operation of the indicator device.

Figure 8:
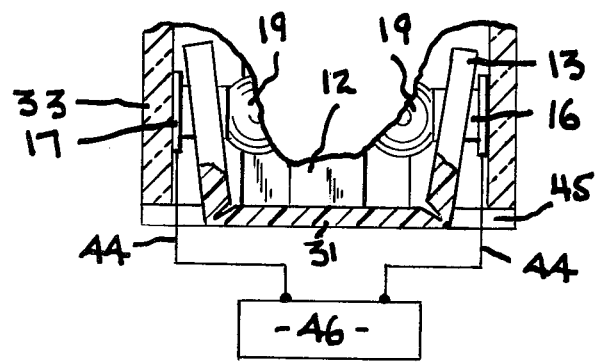
FIG. 8 is a fragmentary cross-sectional view, similar to FIG. 5 showing another modification of the invention.

FIG. 8 shows a representative means for utilizing the indicator device as a switch element in an electrical signal or alarm circuit. Inasmuch as the ball seat elements 16, the balls 19 and the coil spring 20 are all made of electro-conductiive materials which provide a continuity of electrical circuit between an opposed pair of elements 16, electrical leads 44 may be secured to the elements 16 and these leads may be brought exteriorly of the indicator device 10 through suitable apertures 45 in the base for connection to any form of electrical signal circuit, schematically indicated by the block 46. When the inertial mass assembly is dislodged in response to an excessive impact or shock force, the continuity of the circuit between the opposed elements 16 will be interrupted to trigger an alarm or other signal provided by the circuit. Although this form of the device may have limited application in connection with the transporation of goods, it can have widespread utility in connection with the monitoring of impact forces on operative apparatus, equipment and instruments in those circumstances where the existence of excessive impact should be immediately known to the users of the equipment so that it can be tested for malfunction or damage before its use is continued.

It is to be understood that the forms of my invention, herewith shown and described, are to be taken as preferred examples of the same, and that various changes may be made in the shape, size and arrangement of the parts thereof, without departing from the spirit of the invention or the scope of the subjoined claims.

Having thus described my invention, I claim:

1. In a shock indicator, the combination of a base, a pair of diametrically opposed upstanding support arms carried by said base and yieldably movable relatively thereto, a ball seat element slidably mounted in each of said arms, a ball resting in each of said ball seats, a calibrated spring yieldably retaining said balls in said seats, and means establishing a fixed operative spacing between said ball seats independently of displacement of said support arms to provide a predetermined monitoring level of impact force, whereby said balls are dislodged from said seats in response to an impact force exceeding said monitoring level.

2. A combination as defined in claim 1, wherein said support arms are normally resiliently urged away from each other.

3. A combination as defined in claim 1, wherein said means is an abutment carried by said base adjacent the outboard end of each of said ball seats and limiting outward displacement thereof in response to action of said spring.

4. A combination as defined in claim 2, including second means selectively engageable with at least one of said support arms to displace them relatively toward each other to establish a predetermined transport level of impact force of greater magnitude than said monitoring level of force.

5. A combination as defined in claim 4, including a supplementary ball seat surface provided on each of said arms and engageable with a ball in response to said relative inward displacement of said arms.

6. A combination as defined in claim 4, including a stabilizer rod carried by said spring and having the opposite ends thereof engagable with said spaced balls in response to said relative inward displacement of said support arms.

7. A combination as defined in claim 6, wherein said stabilizer rod is tubular and extends coaxially of said spring.

8. A combination as defined in claim 3, wherein said abutment is provided by a sleeve encircling said arms and secured to said base.

9. A combination as defined in claim 8, wherein at least one of said arms is provided with a projection slidably engageable by said sleeve to cam said arms inwardly relatively to each other in a selected position of said sleeve relatively to said base.

10. A combination as defined in claim 8 wherein at least one of said arms is provided with a projection engagable by said sleeve, and said sleeve is provided with a recess for locking engagement with said projection in response to sliding movement of said sleeve over said arms into securement with said base.

11. A combination as defined in claim 10, including a second recess provided on said sleeve and engagable with said projection to cam said arms relatively toward each other in response to sliding movement of said sleeve over said arms prior to engagement of said projection with said first-named recess.

12. A combination as defined in claim 4, wherein said second means comprises a sleeve slidably movable over said arms to cam them relatively toward each other.

13. A combination as defined in claim 4, wherein said second means comprises an arm-camming element slidably engageable with said arms and movable onto said base.

14. A combination as defined in claim 1, wherein said ball seats, said balls and said spring are electro-conductive and complete an electrically-energized indicator circuit.

15. A combination as defined in claim 1, including a second pair of diametrically opposed upstanding support arms carried by said base and yielding movable relatively thereto, said second pair being angularly displaced 90° from said first-named pair of support arms, a ball seat element slidably mounted in each of said second support arms below the axis defined by said first-named ball seat elements, a ball resting in each of said second ball seat elements, a second calibrated spring yieldably retaining said balls in said second seats, and said means operatively coacting with said second pair of ball seat elements in the same manner as with said first pair of ball seat elements.

16. A combination as defined in claim 2, wherein said support arms are formed of resilient material and are integral with said base.

17. A combination as defined in claim 2, including second spring means engaging said arms to yieldably urge them away from each other.

18. In a shock indicator, the combination of a base, a pair of yieldable support elements carried by said base and presenting opposed retaining recesses in a predetermined first position of spaced relationship, an inertial mass assembly resiliently retained between said opposed recesses and dislodgable therefrom in response to a predetermined monitoring level of impact force, and linearly movable means for selectivelly engaging the displacing said support elements toward each other to a pre-determined second position of spaced relationship to establish a predetermined transport level of impact force for said assembly, the magnitude of said transport level being substantially greater than the magnitude of said monitoring level of impact force.

19. A combination as defined in claim 18, wherein said transport level of impact force is at least twice the magnitude of said monitoring level of impact force.

* * * * *